US010850384B1

(12) United States Patent
Enguita

(10) Patent No.: US 10,850,384 B1
(45) Date of Patent: Dec. 1, 2020

(54) HOUSING FOR UTILITY TOOL ACCESSORY INSERTS AND TOOL ACCESSORY INSERTS

(71) Applicant: Steven Enguita, Fort Myers, FL (US)

(72) Inventor: Steven Enguita, Fort Myers, FL (US)

(*) Notice: Subject to any disclaimer, the term of this patent is extended or adjusted under 35 U.S.C. 154(b) by 0 days.

(21) Appl. No.: 16/503,567

(22) Filed: Jul. 4, 2019

(51) Int. Cl.
| | |
|---|---|
| *B25G 1/08* | (2006.01) |
| *G01C 9/28* | (2006.01) |
| *F21V 33/00* | (2006.01) |
| *F21V 23/04* | (2006.01) |
| *B25F 1/02* | (2006.01) |
| *F21Y 115/10* | (2016.01) |

(52) U.S. Cl.
CPC ............ *B25G 1/08* (2013.01); *B25F 1/02* (2013.01); *F21V 23/0414* (2013.01); *F21V 33/0084* (2013.01); *G01C 9/28* (2013.01); *F21Y 2115/10* (2016.08)

(58) Field of Classification Search
CPC ....... B26B 11/006; B26B 5/006; B25F 1/006; B25F 1/04
See application file for complete search history.

(56) References Cited

U.S. PATENT DOCUMENTS

| | | | | |
|---|---|---|---|---|
| 9,919,435 B1* | 3/2018 | Enguita | .................. | B26B 5/006 |
| 2013/0067698 A1* | 3/2013 | Kahn | ..................... | A46B 17/02 24/303 |
| 2018/0281211 A1* | 10/2018 | Enguita | ..................... | B25F 1/04 |

* cited by examiner

*Primary Examiner* — Joseph L Williams
(74) *Attorney, Agent, or Firm* — Shifrin Patent Law; Dan Shifrin

(57) ABSTRACT

An insert for a utility tool includes a housing; a circular portion extending from a rear surface of the housing, the circular portion having a first diameter; a circular button extending from the circular portion, the button having a second diameter less than the first diameter; means for securing the housing on the utility tool; and a tool accessory secured within the housing. Tool accessories may include a laser, an LED light, and a bubble level, among others.

11 Claims, 4 Drawing Sheets

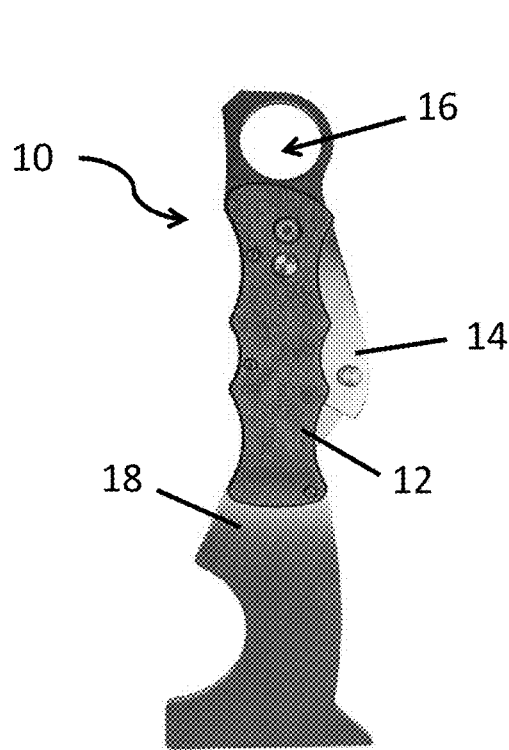
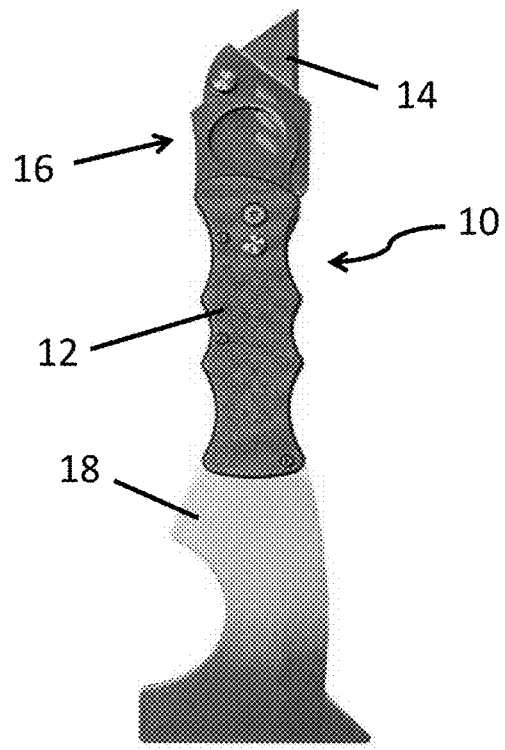
FIG. 1A
(Prior Art)
FIG. 1B
(Prior Art)
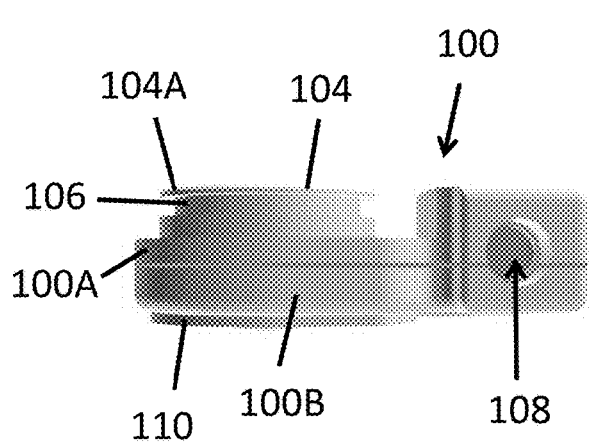
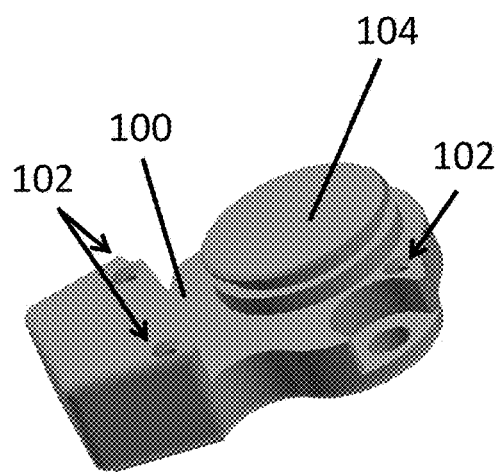
FIG. 2
FIG. 3

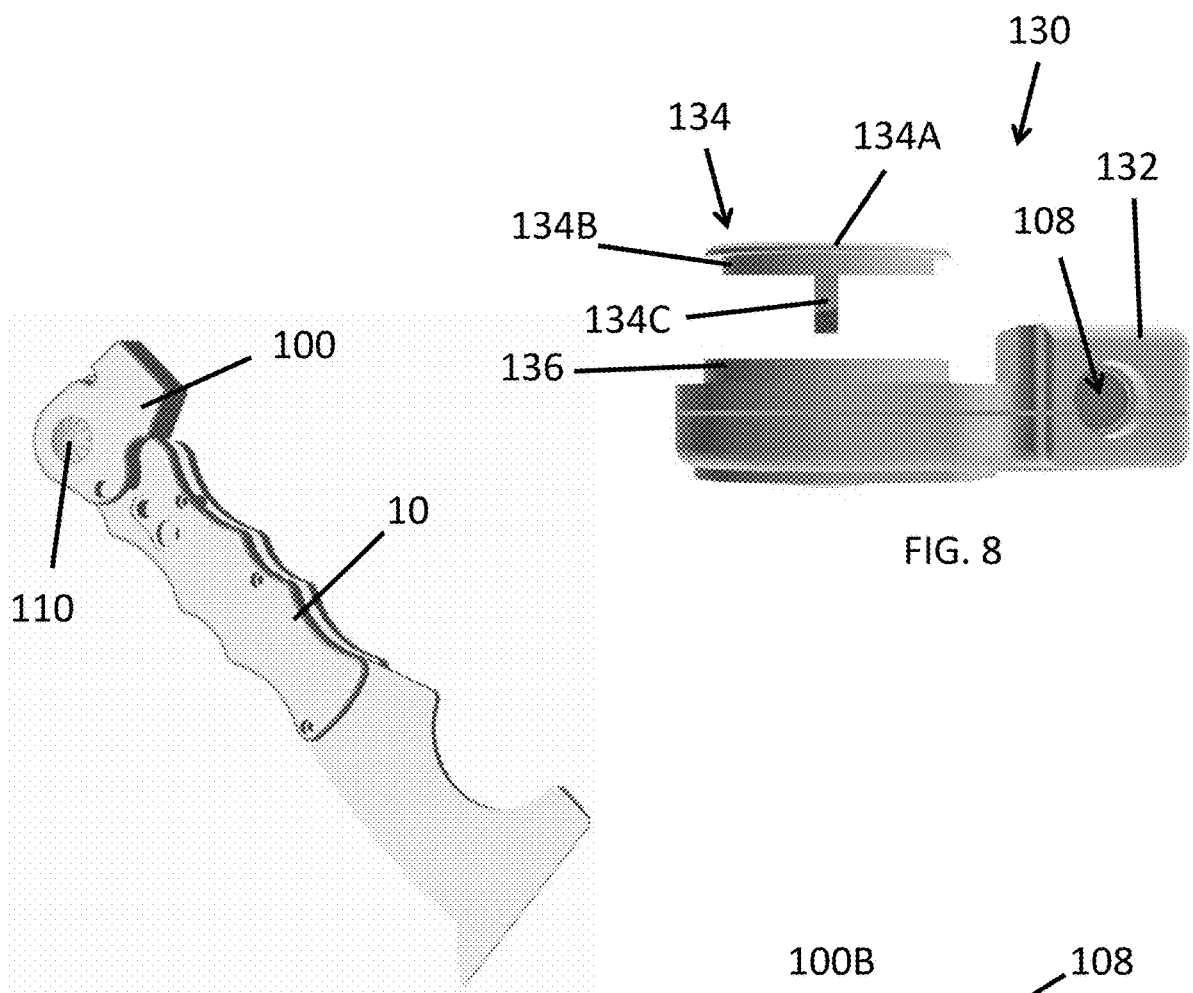
FIG. 8
FIG. 9
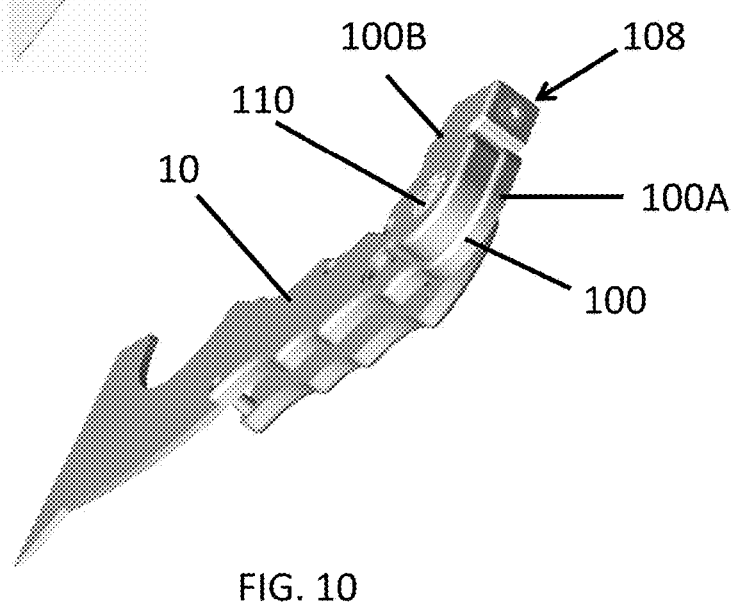
FIG. 10

HOUSING FOR UTILITY TOOL ACCESSORY INSERTS AND TOOL ACCESSORY INSERTS

TECHNICAL FIELD

The present invention relates generally to tools and, in particular, to inserts for tools such as utility tools and knives.

BACKGROUND ART

Multi-tools, that is small tools that can contain several different tools in one unit, are extremely popular. Being able to carry a knife, pliers, and screwdrivers, and more on a single tool that can be clipped to a belt is convenient and efficient. However, often having a tool that performs one specific job well, instead of having a multi-tool that performs various tasks only adequately, is especially important to those in a professional trade.

For example, a utility tool, such as the tool 10 illustrated in FIG. 1, can perform many cutting jobs quicker and more efficiently than the knife on a multi-tool. And, because its blade can be easily replaced when it becomes dull, it has advantages over a pocket knife, as well.

Nonetheless, there are times when it would be useful to not have make the tradeoff between the convenience of having a tool that performs more than one function and the efficiency of having a tool that performs one function well.

SUMMARY OF THE INVENTION

Embodiments of the present invention provide an insert for a utility tool. The insert comprises a housing; a circular portion extending from a rear surface of the housing, the circular portion having a first diameter; a circular button extending from the circular portion, the button having a second diameter less than the first diameter; means for securing the housing on the utility tool; and a tool accessory secured within the housing. Tool accessories may include a laser, an LED light, and a bubble level, among others.

BRIEF DESCRIPTION OF THE DRAWINGS

FIG. 1A illustrates a prior art utility tool, with which embodiments of the tool insert of the present invention may be used, with the knife blade folded;

FIG. 1B illustrates the prior art utility tool of FIG. 1A with the knife blade extended;

FIG. 2 is a side view of an embodiment of a tool insert housing of the present invention;

FIG. 3 is a rear perspective view of an embodiment of a laser insert incorporated into the housing of FIG. 2;

FIG. 8 is an exploded side view of another embodiment of the laser insert of FIG. 3;

FIG. 9 is a perspective view of the laser insert of FIG. 3 secured to the utility tool of FIG. 1A;

FIG. 10 is an end perspective view of the laser insert of FIG. 3 secured to the utility tool of FIG. 1A;

DETAILED DESCRIPTION OF THE PREFERRED EMBODIMENT

Figure 4:
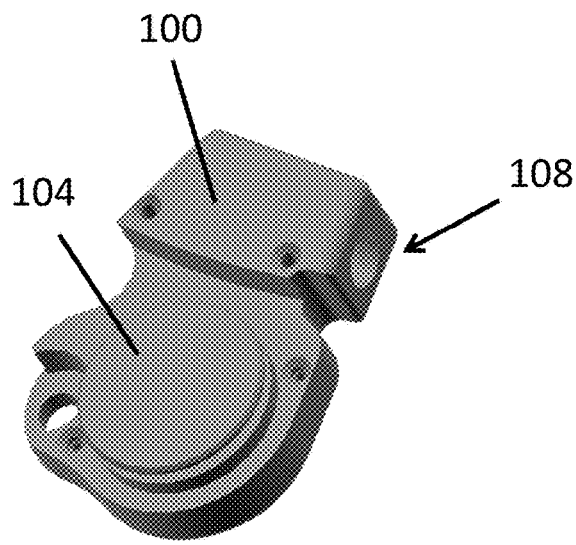
FIG. 4 is another rear perspective view of an embodiment of a laser insert incorporated into the housing of FIG. 3.

The described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention can be practiced without one or more of the specific details, or with other methods, components and so forth. In other instances, well-known structures, materials, or operations are not shown or described in detail to avoid obscuring aspects of the invention.

FIGS. 1A and 1B (collectively FIG. 1) illustrate a prior art utility tool 10 that includes a handle 12, a replaceable blade 14, which can fold into (FIG. 1A), or extend from (FIG. 1B), the handle 12. The tool 10 also include a hole 16, which is useful for hanging the tool 10 on a peg hook, for example. The illustrated tool 10 also includes a scraper or putty blade 18. Although embodiments of the present invention are described and illustrated in association with the utility tool of FIG. 1, they may also be adapted for use with other utility knives and other tools.

Figure 5:
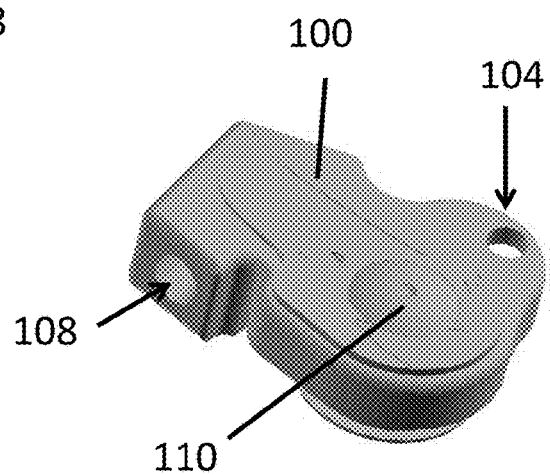
FIG. 5 is a front perspective view of the laser insert of FIG. 3.

FIG. 2 is a front perspective view of an embodiment of a tool housing 100 of the present invention that may be inserted into and secured within the opening 16 of the tool of FIG. 1. FIGS. 3-5 illustrate views of an embodiment of the housing 100 of FIG. 2 in which a laser is incorporated. The housing 100 may be formed from two sections 100A, 100B that are secured together after components are secured inside. Screws in screw holes 102 may be used or the two sections 100A, 100B may be joined by, for example, fusing or cementing them together. In some variations, the housing 100 may instead be formed as a single piece.

The housing 100 also includes a button 104 that extends from a reduced diameter section 106 on the rear surface of the housing 100. The button 104 may be formed from a material that is flexible, at least around the perimeter 104A, having a diameter somewhat larger than the diameter of the finger hole 16 in the tool 10. The flexible perimeter 104A, such as an O-ring, allows the button 104 to be inserted through the finger hole 16 and remain secure.

The housing 100 is configured to accommodate a tool accessory. When a light or laser is secured within the housing 100, the housing 100 includes an opening 108 through which light is emitted. In addition, a button or other type of switch 110, secured in or to the front of the housing 100, is used to activate and deactivate the light or laser.

Figure 6:
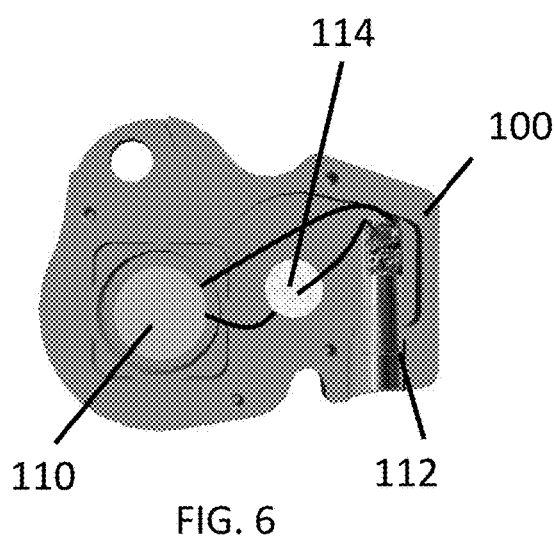
FIG. 6 is a cut-away view of the laser insert of FIG. 3.

FIG. 6 is a cut-away view of the housing 100 in which a laser or LED 112 is secured. In addition to the light 112, components within the housing 100 include one or more batteries 114 electrically coupled to the switch 110 and light 112. Pushing the switch 110 allows a current to flow to the light 112 from the battery 114 and activate the light 112.

Figure 7:
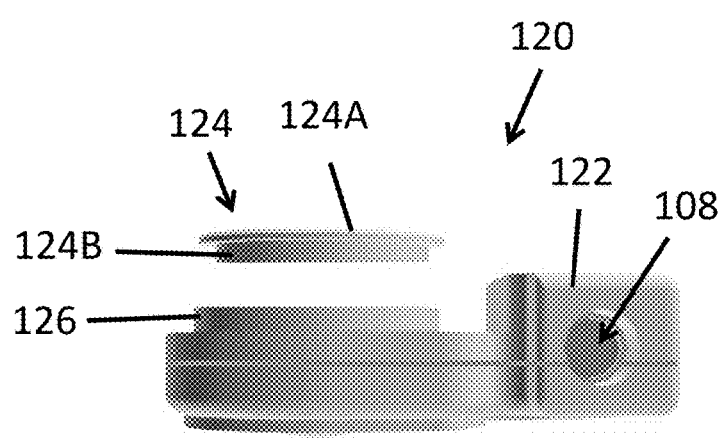
FIG. 7 is an exploded side view of another embodiment of a tool insert housing of the present invention.

FIG. 7 is an exploded side view of another embodiment of a housing 120 of the present invention. The housing 120 includes a main body 122 and a removable cap 124. The cap 124 includes a top piece 124A and a lower piece 124B having a diameter equal to or less than the diameter of the hole 16 of the tool and less than the diameter of the top piece 126. To secure the housing 120 to the tool 10, the cap 124 is removed from the main body 122. A round extension 126 on the rear of the main body 122 is aligned with the hole 16 and the lower piece 124B of the cap 124 is inserted through the hole 16. The cap 124 may be secured to the main body 122 by, for example, screwing or snapping the cap into the main body 122. Alternatively, the cap 124 may be secured to the main body 122 magnetically, with the lower piece 124B or the entire cap 124 being of one magnetic polarity and the extension 126 being a ferrous metal or being of the opposite polarity. Other appropriate means of attaching the housing 120 to the tool 10 may also be used.

FIG. 8 is an exploded side view of a variation of the embodiment of FIG. 7. Similar to the housing 120, the housing 130 includes a main body 132, a cap 134, and a round extension 136 on the rear of the main body 132. The cap 134 includes a top piece 134A, a lower piece 134B, and a threaded screw 134C. To secure the housing 130 to the tool 10, the cap 134 is removed from the main body 132. The round extension 136 is aligned with the finger hole 16 and the screw 134C is inserted through the finger hole 16. The cap 134 is then secured to the main body 132 by screwing the threads of the screw into corresponding threads in the main body 132 or extension 136. It will be appreciated that the embodiment of FIG. 8 may be used to secure a housing 100 to a conventional utility tool using a hole at one end that is used for hanging the tool.

Figure 11B:
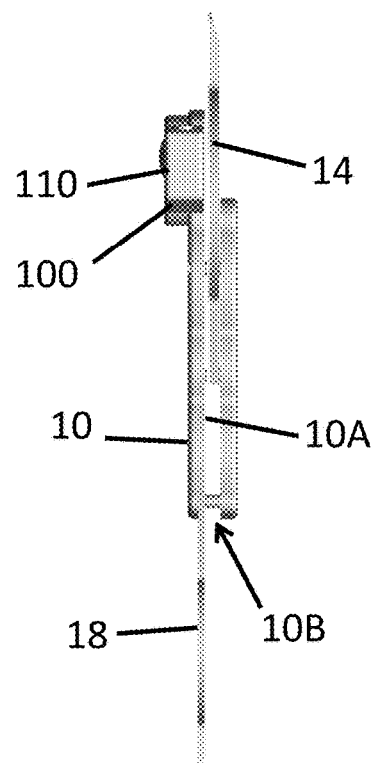
FIG. 11B is a top view of the laser insert of FIG. 3 secured to the utility tool of FIG. 1A.
Figure 11A:
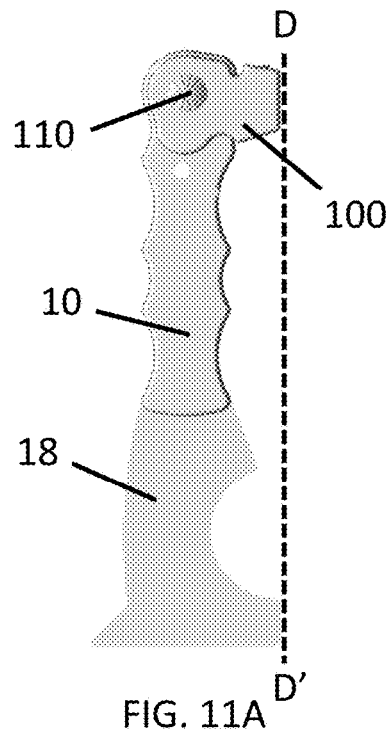
FIG. 11A is a side view of the laser insert of FIG. 3 secured to the utility tool of FIG. 1A.

FIGS. 9 and 10 illustrate different views of the housing 100 (or 120 or 130) for a light (laser or LED) attached to the tool 10. FIG. 11A is a side view of the housing 100 attached to the tool 10 with the blade 14 in the closed (folded) position. As seen in FIG. 11B, the rear of the housing 100 (that is, the side of the housing opposite the side with the switch 110) is substantially flush with the inner surface 10A of the tool 10. Thus, the housing 100 does not interfere with the blade 14 (not shown in FIG. 11B) when it is extended from the space 10B to its working position.

Figure 12:
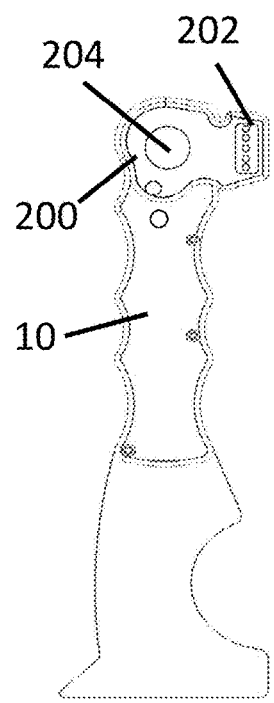
FIG. 12 is a side view of a LED light insert secured to the utility tool of FIG. 1.

In addition to the housing 100 containing a light 112, an embodiment may include a housing 200 for a single or multiple LED side light 202 (FIG. 12) operated by a switch 204.

Figure 13A:
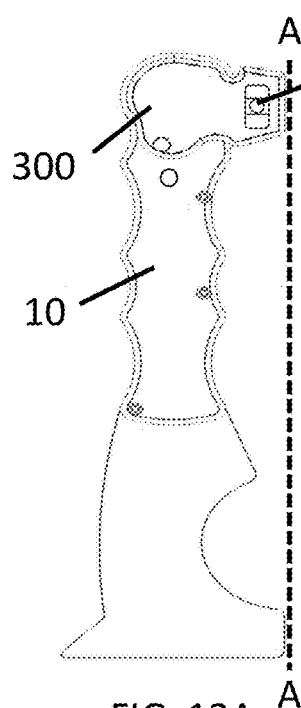
FIG. 13A is a side view of one embodiment of a bubble level insert secured to the utility tool of FIG. 1A.
Figure 13B:
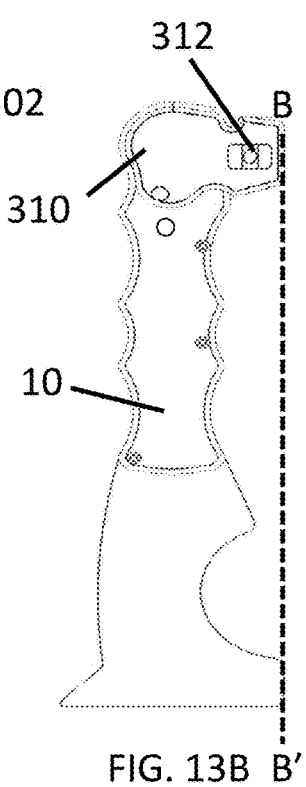
FIG. 13B is a side view of another embodiment of a bubble level insert secured to the utility tool of FIG. 1A.
Figure 13C:
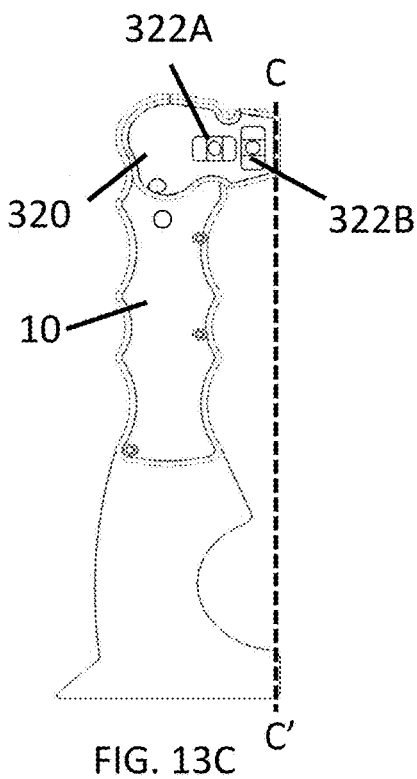
FIG. 13C is a side view of still another embodiment of a bubble level insert secured to the utility tool of FIG. 1A.

Housings may also incorporate one or more bubble levels. FIG. 13A illustrates a housing 300 with a single bubble level 302 to indicate when a surface is level along a first axis. FIG. 13B illustrates a housing 310 with a single bubble level 312 that is rotatable around an axis 90° to indicate when a surface is level in either of two perpendicular axes. FIG. 13C illustrates a housing 320 with a two perpendicular bubble levels 322A, 322B to indicate when a surface is level in two perpendicular axes simultaneously.

Preferably, the front edges of the two ends of the tool 10 are aligned with each other. For example, the dotted lines in FIGS. 13A, B, C, between the ends A-A', B-B', and C-C', respectively, illustrate that when the tool 10 is placed on a surface, the ends A-A', B-B', and C-C' will be parallel with the surface, such that the bubble levels 302, 312, 322A,B are also level with the surface, providing an accurate reading. Similarly, if the laser 112 and the opening 108 in the laser housing 100 are arranged so that the light is emitted from the front of the housing 100, the emitted beam will be parallel with the surface on which the ends D-D' of the tool 10 rest.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. An insert for a utility tool, comprising:
   a housing;
   a circular portion extending from a rear surface of the housing, the circular portion having a first diameter;
   a circular button extending from the circular portion, the button having a second diameter less than the first diameter;
   means for securing the housing on the utility tool; and
   a tool accessory secured within the housing.

2. The insert of claim 1, wherein the tool accessory comprises
   a laser;
   a power source within the housing; and
   a switch operable to activate and deactivate the laser.

3. The insert of claim 2, wherein the switch comprises a push button switch.

4. The insert of claim 1, wherein the tool accessory comprises:
   an LED light;
   a power source within the housing; and
   a switch operable to activate and deactivate the LED light.

5. The insert of claim 4, wherein the switch comprises a push button switch.

6. The insert of claim 1, wherein the tool accessory comprises a bubble level.

7. The insert of claim 6, wherein the bubble level comprises a single bubble level configured to indicate when a surface is level along a first axis.

8. The insert of claim 7, wherein the single bubble level rotates 90°.

9. The insert of claim 6, wherein the bubble level comprises a double bubble level configured to indicate when a surface is level along two perpendicular axes.

10. The insert of claim 1, wherein the means for securing comprises a flexible perimeter around the button, whereby, when the button being inserted into an opening in the utility tool, the housing is secured on the utility tool with the button retained within the opening.

11. The insert of claim 1, wherein the means for securing comprises a removable cap screwable into the circular button.

* * * * *